United States Patent Office 2,788,355
Patented Apr. 9, 1957

2,788,355

6,8-DITHIOLOCTANOIC ACID, SALTS AND ESTERS THEREOF

Milon W. Bullock, Pearl River, N. Y., assignor to American Cyanamid Company, New York, N. Y., a corporation of Maine No Drawing. Application October 19, 1953, Serial No. 387,043

3 Claims. (Cl. 260—399)

This invention relates to new organic compounds. More particularly, it relates to dithiol aliphatic acids and esters and salts thereof and methods of preparing the same.

In my copending application, Serial Number 284,205, filed April 24, 1952, I described the preparation of omega[3(1,2-dithiolanyl)]aliphatic acids, salts and esters thereof. These compounds were described as oxidation inhibitors and growth supporting factors for certain microorganisms including S. facelis, Tetrahymena geleii and some Corynebacterium species. Also disclosed in the said application was the use of dithiol aliphatic acids and esters and salts thereof as intermediates in the preparation of the active compounds. The present application is a continuation-in-part of application, Serial Number 284,205 and describes and claims the said intermediates.

The new compounds of the present invention may be illustrated by the following structural formula:

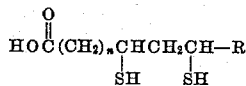

in which $n$ is a whole number less than 7, R is hydrogen or a lower alkyl radical. Since the compounds contain a carboxylic acid group, they will form esters such as the methyl, ethyl, propyl, butyl, isobutyl or amyl esters and salts such as alkali metal and alkaline earth metal salts, and the like.

The compounds of the present invention are, in general, liquids at room temperature although in some instances they may be low melting solids. They are immiscible with water and soluble or miscible, in general, with organic solvents such as benzene, chloroform, ether, etc.

To prepare the compounds of the present invention it is preferred that thiol hydroxy acids having the formula:

HOOC(CH₂)ₙCH(OH)CH₂CH(SH)R where $n$ is a small whole number less than 7 and R is a lower alkyl radical be used. Compounds of this type can be compounds such as 8-thiol-6-hydroxynonanoic acid; 8-thiol-6-hydroxyoctanoic acid; 7-thiol-5-hydroxyheptanoic acid; 6-thiol-4-hydroxyhexanoic acid; 5-thiol-3-hydroxypentanoic acid, and the like. These thiol hydroxy acids are reacted with an excess of thiourea and a halogen acid such as 48% hydrobromic acid or 50% hydroiodic acid.

The reaction can preferably be carried out by mixing the thiolhydroxy acid, thiourea and halogen acid and heating at refluxing temperatures. The temperature at which the reaction will take place may vary from 70 to 150°. The reaction, when heated at refluxing temperatures, usually requires from two to about twelve hours to complete. In the course of the reaction thiouronium salts are formed as intermediates and are then hydrolyzed to the dithiol aliphatic acids by treatment with an alkaline substance. This alkaline substance can be compounds such as sodium hydroxide, potassium hydroxide, sodium carbonate, potassium carbonate and the like.

After completion of the reaction and hydrolysis of the thiouronium salts, the products may be obtained by acidification of the alkaline solution which liberates the dithiol aliphatic acid. The acids can then be recovered by extraction with an organic solvent such as chloroform and the like.

The following examples illustrate in greater particularity the preparation of the compounds of the present invention.

Example 1

A solution of 15 g. (0.376 mole) of sodium hydroxide in 150 ml. of water was added to 27 g. (0.103 mole) of ethyl 8-acetylthio-6-hydroxyoctanoate. The solution became homogeneous when shaken. The solution was refluxed 35 minutes, cooled and acidified with concentrated hydrochloric acid. The product was extracted with two 100 ml. portions of ether. The combined ether extracts were dried over sodium sulfate and distilled leaving a residue weighing 26 g. and having the odor of acetic acid. To this crude product of 8-thiol-6-hydroxyoctanoic acid were added 75 g. thiourea and 200 ml. of 50% hydriodic acid. The resulting solution was heated at reflux ten hours and cooled. The solution was made alkaline by the addition of 50 g. of sodium hydroxide in 150 ml. of water and refluxed 30 minutes. The solution was cooled and acidified with hydrochloric acid. The product was extracted with three 80 ml. portions of chloroform. The combined chloroform extracts were dried over sodium sulfate and distilled leaving 21.5 g. of an oil consisting in the main of 6,8-dithioloctanoic acid together with small amounts of 2-(delta-carbethoxybutyl)trimethylene sulfide and 6,8-dithiooctanoic acid which is formed by air oxidation of the principal product. The product was distilled and the fractions collected as follows:

| No. | Boiling Point | Pressure, mm. | Weight, g. |
|---|---|---|---|
| 1 | 136–140 | 0.15 | 1.1 |
| 2 | 140–150 | 0.15 | 2.5 |
| 3 | 150–164 | 0.15 | 9.5 |
| 4 | 164–168 | 0.15 | 0.7 |

Fractions 1 and 2 are primarily 2-(delta-carboxybutyl)-trimethylene sulfide while fractions 3 and 4 are 6,8-dithioloctanoic acid mixed with a small amount of the air oxidized disulfide. The purified 6,8-dithioloctanoic acid had a boiling point 146° at 0.04 mm., $n_D^{20}$ 1.5235 and $d^{20}$ 1.132.

Example 2

A solution of 5.8 g. (0.032 mole) of 8-thiol-6-hydroxyoctanoic acid (prepared by the reduction of an 8-acetylthio-6-ketooctanoic acid ester and hydrolysis), 5 g. (0.066 mole) thiourea and 25 ml. of 50% hydriodic acid was refluxed eight hours. The solution was made alkaline with 40% potassium hydroxide and refluxed 30 minutes. The alkaline solution was extracted with chloroform which was discarded. The aqueous solution was acidified with concentrated hydrochloric acid and extracted with two 25 ml. portions of chloroform. The combined chloroform extracts were dried over sodium sulfate and distilled leaving 4.3 g. of pale yellow oil having equivalent weight 196. The product was 6,8-dithioloctanoic acid.

Example 3

Ethyl 8-thiolacetyl-6-hydroxynonanoate, 26.6 g. (0.0963 mole) was saponified by refluxing 40 minutes with a solution of 8.5 g. (0.212 mole) sodium hydroxide in 100 ml. water. The solution was cooled, acidified and extracted with two 100 ml. portions of ether. The combined ether extracts were dried over sodium sulfate and distilled leaving 27 g. of a colorless viscous oil. This oil was treated with 75 g. thiourea followed by 200 g. 50% hydriodic acid. The resulting solution was heated at reflux 18 hours. The solution was cooled and made alkaline with 5 M sodium hydroxide. The alkaline solution was refluxed 40 minutes, cooled some and acidified with concentrated hydrochloric acid. The aqueous solution was extracted with two 100 ml. portions of chloroform. The combined chloroform extracts were dried over sodium sulfate and distilled. The yellow oily residue was distilled through a 6 inch vacuum jacketed Vigreux column. The product was collected in two fractions. The lower boiling fraction, boiling point 134–146° at 0.2 mm., weight 6.1 g. is primarily 3-methyl-2-(deltacarboxybutyl)trimethylene sulfide. The fraction boiling point 148–166° at 0.2–0.15 mm., weight 9.4 g., is a mixture of the dithiol acid and the cyclic disulfide from air oxidation of the dithiol acid. The product partially crystallized in the receiver. The crystals were filtered off and recrystallized from cyclohexane. This gave 4.5 g. of bright yellow crystals, melting point 45–46°. The noncrystalline material was oxidized with oxygen using ferric chloride as catalyst. This yielded, after recrystallization from cyclohexane, 1.4 g. of yellow crystals, melting point 54–54.5°.

The lower melting product changed to the higher melting product on standing. A mixed melting point was not depressed. The total yield of 6,8-dithiononanoic acid from this reaction was 5.6 g. (0.0254 mole), 26%.

*Example 4*

A mixture of 18 g. of 7-thiol-5-hydroxyheptanoic acid, 20 g. of thiourea and 40 ml. of 50% hydriodic acid were refluxed eight hours. The product was isolated as described in the examples above and the 5,7-dithiolheptanoic acid oxidized to the intramolecular disulfide with potassium triiodide. The yield was 10 g. of 5,7-dithiolheptanoic acid which distilled 152–160° at 0.1 mm.

I claim:
1. Compounds having the formula:

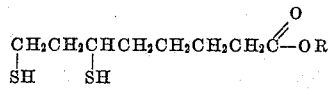

in which R is a member of the group consisting of hydrogen, alkali metal, and lower alkyl radicals.

2. 6,8-dithioloctanoic acid.

3. A method of preparing 6,8-dithioloctanoic acid which comprises reacting 8-thiol-6-hydroxyoctanoic acid with thiourea and a halogen acid and subsequently with an alkali metal hydroxide and finally acidifying the reaction mixture and recovering said compound therefrom.

References Cited in the file of this patent
UNITED STATES PATENTS

| | | |
|---|---|---|
| 2,422,246 | Lazier et al. | June 17, 1947 |
| 2,468,426 | Chenez et al. | Apr. 26, 1949 |
| 2,568,648 | McCool | Sept. 18, 1951 |

OTHER REFERENCES

Whitmore: Organic Chemistry, 1937, vol. 1, page 599.
Gilman: Organic Chemistry, 1943, vol. 1, page 841.
Hall: Journal of The American Chemical Society, vol. 65; 1466 (1943).
"Preparation of Mercaptans from Alcohols" by R. C. Frank and P. V. Smith, J. A. C. S. 68, 2103 (1946).
Gortner: Biochemistry, 1949, page 499.
Bailey: Ind. Oil and Fat Products, 1951, pages 272, 309.
Bullock et al.: Journal of The American Chemical Society, vol. 74, 3455 (1952).
Calvin: Journal of The American Chemical Society, vol. 74, 6153–4 (1952).